(No Model.)
J. J. ELLSWORTH.
VEHICLE SHAFT SUPPORT.
No. 280,459. Patented July 3, 1883.
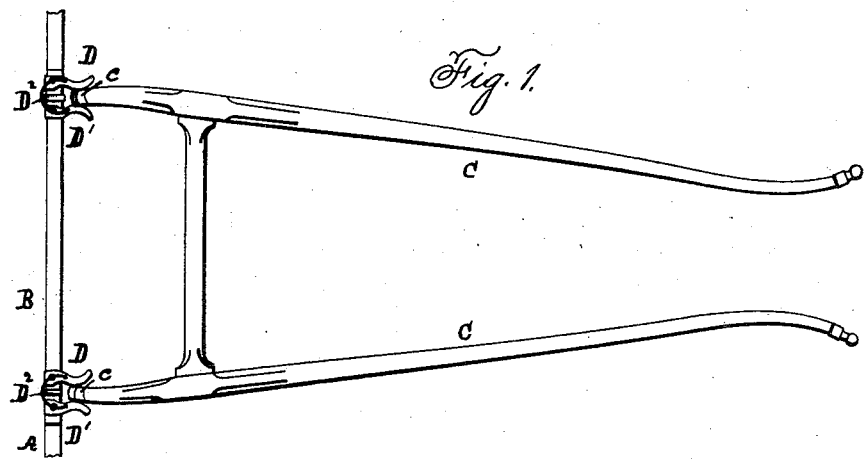
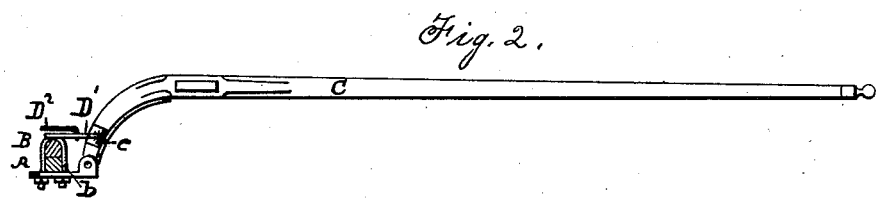
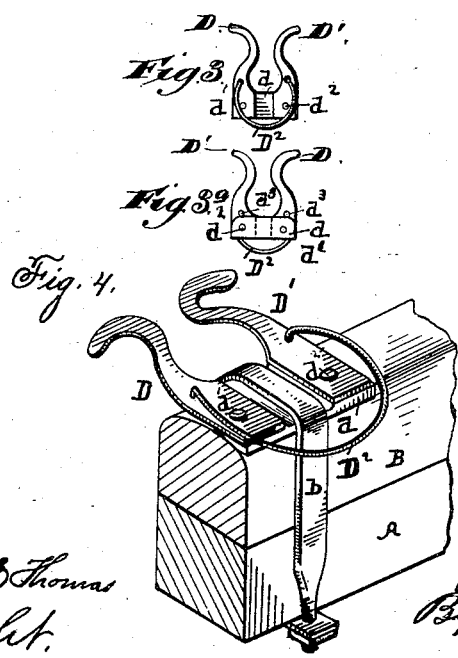
WITNESSES
Samuel E Thomas
N. S. Wright
INVENTOR
John J. Ellsworth
By W. W. Leggett
Attorney

UNITED STATES PATENT OFFICE.

JOHN J. ELLSWORTH, OF LANGSTON, MICH., ASSIGNOR OF TWO-THIRDS, BY DIRECT AND MESNE ASSIGNMENTS, TO GEORGE A. WATSON, OF SAME PLACE.

VEHICLE SHAFT-SUPPORT.

SPECIFICATION forming part of Letters Patent No. 280,459, dated July 3, 1883.

Application filed February 27, 1883. (No model.)

*To all whom it may concern:*

Be it known that I, JOHN J. ELLSWORTH, of Langston, county of Montcalm, State of Michigan, have invented a new and useful Improvement in Vehicle Shaft - Supporters; and I declare the following to be a full, clear, and exact description of the same, such as will enable others skilled in the art to which it pertains to make and use it, reference being had to the accompanying drawings, which form a part of this specification.

My invention consists in the combination of devices and appliances, hereinafter specified, and more particularly pointed out in the claims.

In the drawings, Figure 1 is a plan view of an apparatus embodying my invention. Fig. 2 is an end view. Fig. 3 is a top view of the shaft-supporter detached from the axle; Fig. 3$^a$, a detached view, looking at the opposite side of the supporter to that shown in Fig. 3; Fig. 4, a perspective view of part of the axle with the supporter in position thereon.

It is the object of my invention to provide an improved vehicle shaft-supporter adapted for use either for single or double vehicles, which may be easily adjusted to the vehicle, and which shall at the same time be economical in construction, and which may be readily operated. I accomplish this object as follows:

In the drawings, A represents the axle.

B represents the head-block of the vehicle.

C represents the shafts, secured to the vehicle in any ordinary manner.

$b$ represents ordinary clips, by which the head-block and the axle are secured together.

D and D' represent two jaws of my improved shaft-supporter, said jaws pivoted to a bed-piece, $d$, as shown at $d'$ and $d^2$, said bed-piece adapted to be secured underneath the clip $b$, the head-block being suitably cut away, if desired, for this purpose.

$D^2$ represents a suitable spring, secured at its extremities to each of the jaws D and D' at any suitable point. I prefer to construct said jaws curved outwardly at their extremities, as shown, and provided with suitable recesses midway of their extremities to engage the shafts. I desire to provide the shafts with a suitable wearing-plate or ferrule, $c$, which may readily be secured upon said shaft in any proper manner. To prevent the two jaws from both turning in the same direction on their pivots $d$ and $d^2$, I provide each of said jaws with a stop, $d^3$, adapted to this purpose.

The operation of this device will be seen from this description. By throwing up the shafts they will readily be engaged between the two jaws, where they will be held by a suitable tension of the spring.

It is evident that with the exception of the spring this apparatus may be cheaply constructed of malleable or other metal.

It is also obvious, since they are held in place upon the head-block by means of the ordinary clips, $b$, they may be readily adjusted upon the vehicle.

I am aware that a vehicle shaft-supporter has been constructed consisting of elastic clamps constructed in a single piece; but I do not claim such a construction.

What I claim is—

1. A vehicle shaft-supporter consisting of suitable jaws, D and D', pivoted at the rear to a base-plate and connected by a suitable spring, the construction being such that said base-plate may be readily secured beneath an ordinary clip to the vehicle, substantially as described.

2. A vehicle shaft-supporter consisting of suitable jaws, D and D', pivoted at the rear to a base-plate and connected by a suitable spring, said jaws provided with stops $d^3$, substantially as described.

3. The combination, with the axle and head-block, of a vehicle shaft-supporter, said supporter consisting of jaws D and D', provided with stops $d^3$, pivoted at the rear to a base-plate and connected by a suitable spring, said plate secured upon the head-block underneath suitable clips, $b$, substantially as described.

4. The combination, with a head-block, axle, and shafts of an ordinary vehicle, of one or more vehicle shaft-supporters, consisting of jaws D and D', provided with stops $d^3$, said jaws pivoted at the rear to a base-plate and connected by a suitable spring, said base-plate secured in place underneath suitable clips, $b$, said shafts provided with a suitable wearing-plate or ferrule, $c$, substantially as described.

In testimony whereof I sign this specification in the presence of two witnesses.

JOHN J. ELLSWORTH.

Witnesses:
N. S. WRIGHT,
WILLIAM F. FORD.